United States Patent [19]

Ogunsunlade

[11] Patent Number: 4,731,808
[45] Date of Patent: Mar. 15, 1988

[54] GUIDES FOR INTRAORAL X-RAYS

[76] Inventor: Olutunde A. Ogunsunlade, 5804 Lamont Dr., New Carrollton, Md. 20784

[21] Appl. No.: 873,985

[22] Filed: Jun. 13, 1986

[51] Int. Cl.$^4$ .................. A61B 6/14; G03B 42/04; G03C 5/16
[52] U.S. Cl. ..................................... 378/170; 378/168
[58] Field of Search ................ 378/170, 38, 169, 205, 378/168, 167, 195, 196, 197; 250/491.1

[56] References Cited

U.S. PATENT DOCUMENTS

| | | | | |
|---|---|---|---|---|
| 2,264,410 | 12/1941 | Schier | ............................. | 378/195 |
| 2,392,109 | 1/1946 | Vlock | ............................. | 378/170 |
| 3,473,026 | 10/1969 | Updegrave | ............................. | 378/170 |
| 4,295,050 | 10/1981 | Linden | ............................. | 378/170 |

Primary Examiner—Carolyn E. Fields
Assistant Examiner—Joseph A. Hynds
Attorney, Agent, or Firm—Jerome J. Norris

[57] ABSTRACT

Exterior guides for use in combination with bite tab film holders and a snap-a-ray type film holder for accurately aligning a beam of an X-ray cone with a film during the process of taking intraoral periapical dental X-rays. In a first embodiment, the exterior guide comprises an h-shaped structure positioned in a horizontal plane with maxillary and mandibular angulation markings on the structure's guide arms. In a second embodiment, the exterior guide comprises a U-shaped structure positioned in a vertical plane having mandibular and maxillary angulation markings on the structure's guide arms.

2 Claims, 9 Drawing Figures

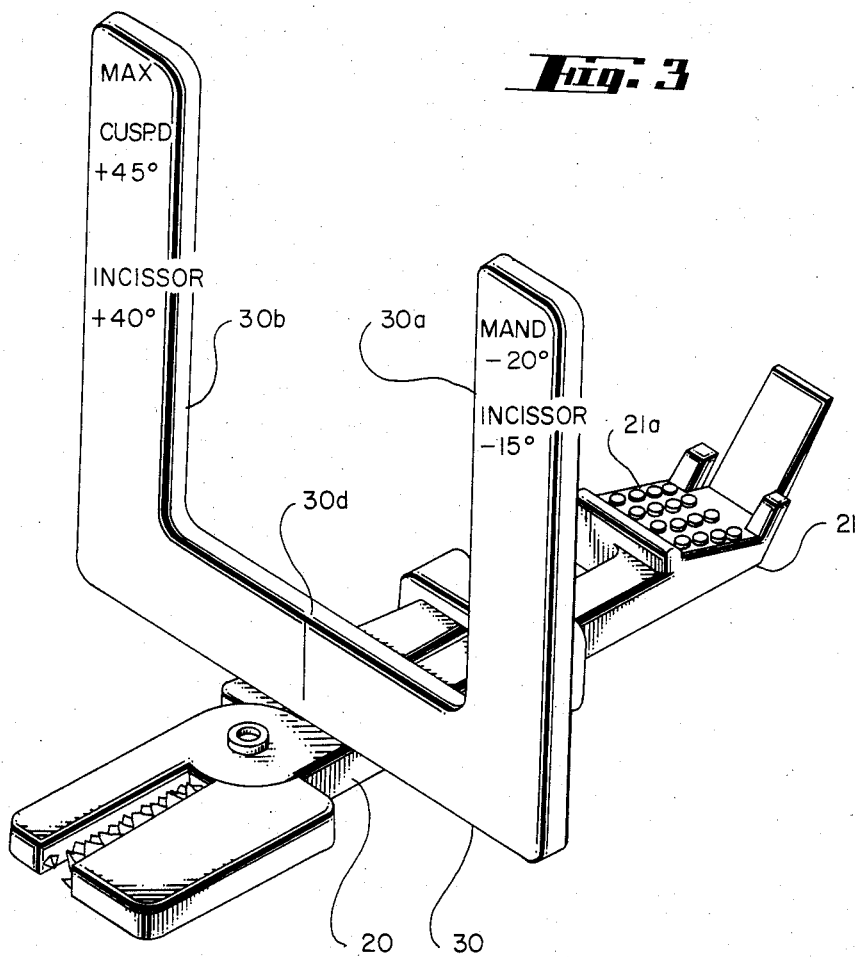
Fig. 3
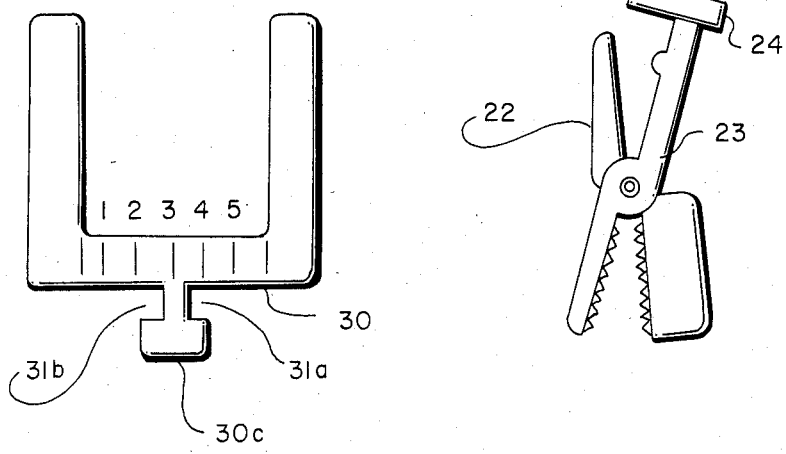
Fig. 8
Fig. 9

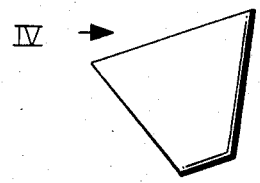
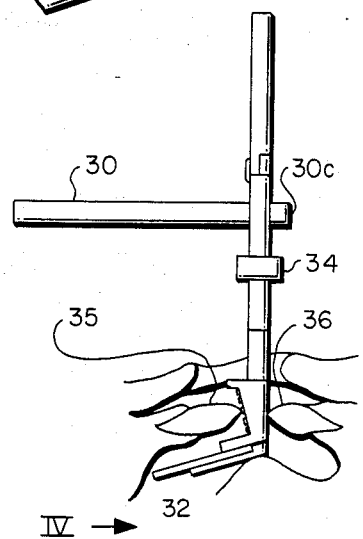
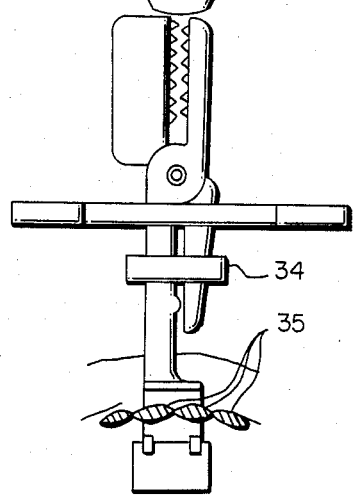
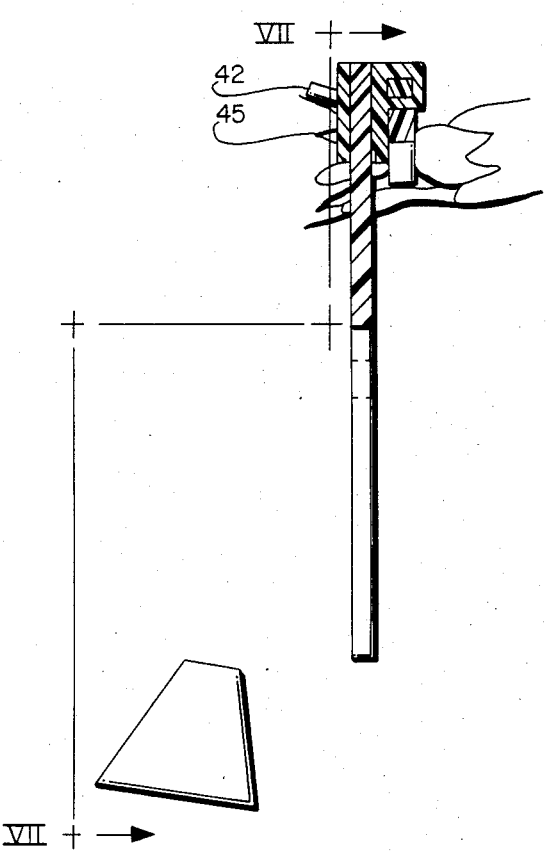
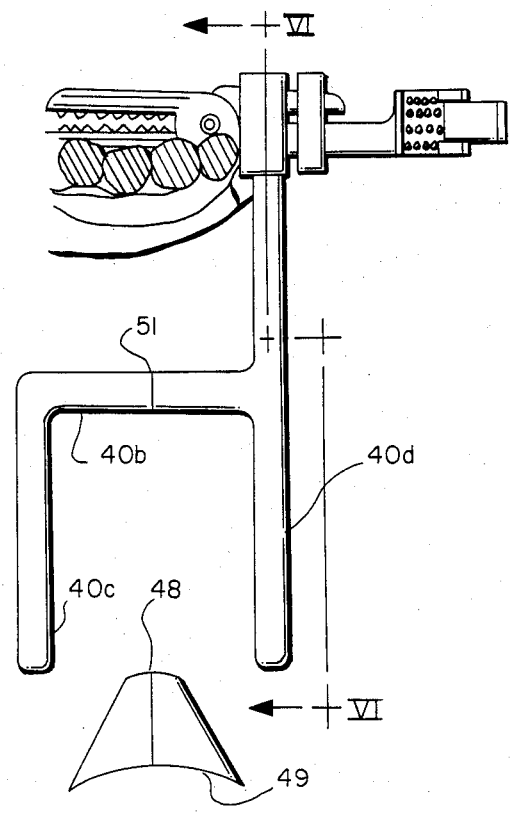

GUIDES FOR INTRAORAL X-RAYS

BACKGROUND OF THE INVENTION

The present invention relates to external guides for accurately directing an X-ray beam to an X-ray film in a film holder, during the process of taking intraoral periapical dental X-rays.

Currently, the technique for taking intraoral periapical dental X-rays entail the use of various bite tab film holders upon which the patient bites in order to immobilize or render the film intraorally stationary.

While a variety of bite tab film holders are used in the intraoral X-ray process, the so called SNAP-A-RAY holder is the most commonly used one in dental offices at present; however, the disadvantageous clinical drawbck of the SNAP-A-RAY holder is that, once the patient closes his mouth, it is very difficult to locate the exact position of the film.

Inability to accurately locate the film frequently leads to difficulties in direting the beam central to the film, and the attendant locative problems associated therewith result in X-rays characterized by the impediments of: (I) Cone cutting; (II) Elongation; (III) Foreshortening; (IV) Teeth apices not appearing in the pictures; (V) Teeth crowns not appearing in the pictures; and (VI) Gross overlapping of the teeth in the pictures.

The consequences of any one or more of the foregoing adversities are non-diagnostic periapical X-rays and the inevitable need to repeat the X-ray process, with the resultant multiple exposure of patients to additional radiation.

SUMMARY OF THE INVENTION

It is an object of the present invention to provide an X-ray guide of material which will not obstruct X-rays, which is simple and easy to manufacture, and which enables accurate direction of the central beam to the X-ray film during the process of taking intraoral periapical dental X-rays.

A further object of the invention is to provide X-ray guides which substantially eliminate, during the process of taking intraoral periapical dental X-rays, the incidences of: (I) Cone cutting; (II) Elongation; (III) Foreshortening; (IV) Apices of the teeth not appearing in the X-ray pictures; (V) Crowns of the teeth not appearing in the X-ray pictures; and (VI) Gross overlapping of the teeth appearing in the X-ray pictures.

A yet further object of the invention is to provide an X-ray guide which will substantially eliminate the incidences of having to expose a patient to multiple radiation during the process of taking intraoral periapical dental X-rays.

According to one embodiment of the present invention, there is provided a lower case h form exterior guide for use in connection with a bite tab film holder for accurately aligning an X-ray beam from an X-ray cone onto X-ray film, for maxillary and mandibular teeth intraoral periapical dental X-rays, comprising:

a first guide arm connected laterally through detachably engageable means to an extended arm of a larger jaw from a film holder and pointing in a horizontal plane perpendicular to said film;

a traverse arm extending from the midpoint of said first guide arm parallel to said film; and a second guide arm extending perpendicularly from the end of said traverse arm toward the plane of said film and in parallel relation up to the end point of said first guide arm; said traverse arm having an index mark for centering or aiming an X-ray cone toward the center of the area of the film.

According to another embodiment of the invention, there is provided a U-form exterior guide with an extended base portion, for use in connection with a film holder for accurately aligning an X-ray beam from an X-ray cone to an X-ray film for upper and lower front teeth intraoral periapical dental X-rays.

The invention is hereinafter further described by reference to the accompanying drawings.

BRIEF DESCRIPTION OF THE DRAWING

FIG. 3 is a view in perspective of the U-form of X-ray guide for positioning the X-ray cone for upper and lower front teeth X-rays.

FIG. 4 is a vertical detailed sectional view through the upper and lower front teeth and also shows the SNAP-A-RAY holder with X-ray film, bite tab, U-form exterior guide with extended base, and an X-ray cone.

FIG. 5 is a detailed sectional view taken along line IV—IV in FIG. 4 and looking in the direction of the arrows.

FIG. 6 is a vertical detailed sectional view through the upper and lower jaw, showing the teeth therein, the film, bite tabe the h-form X-ray guide, and the X-ray cone.

FIG. 7 is a horizontal sectional view as seen from the line VII—VII in FIG. 6 and looking in the direction of the arrows.

FIG. 8 is a perspective view of the U-shaped X-ray guide device.

FIG. 9 is a fragmentary view of an open SNAP-A-RAY holder showing the extended arms of the large and small jaws onto shiwh X-ray guides of the invention are detachably mounted.

DETAILED DESCRIPTION OF THE INVENTION

Figure 1:
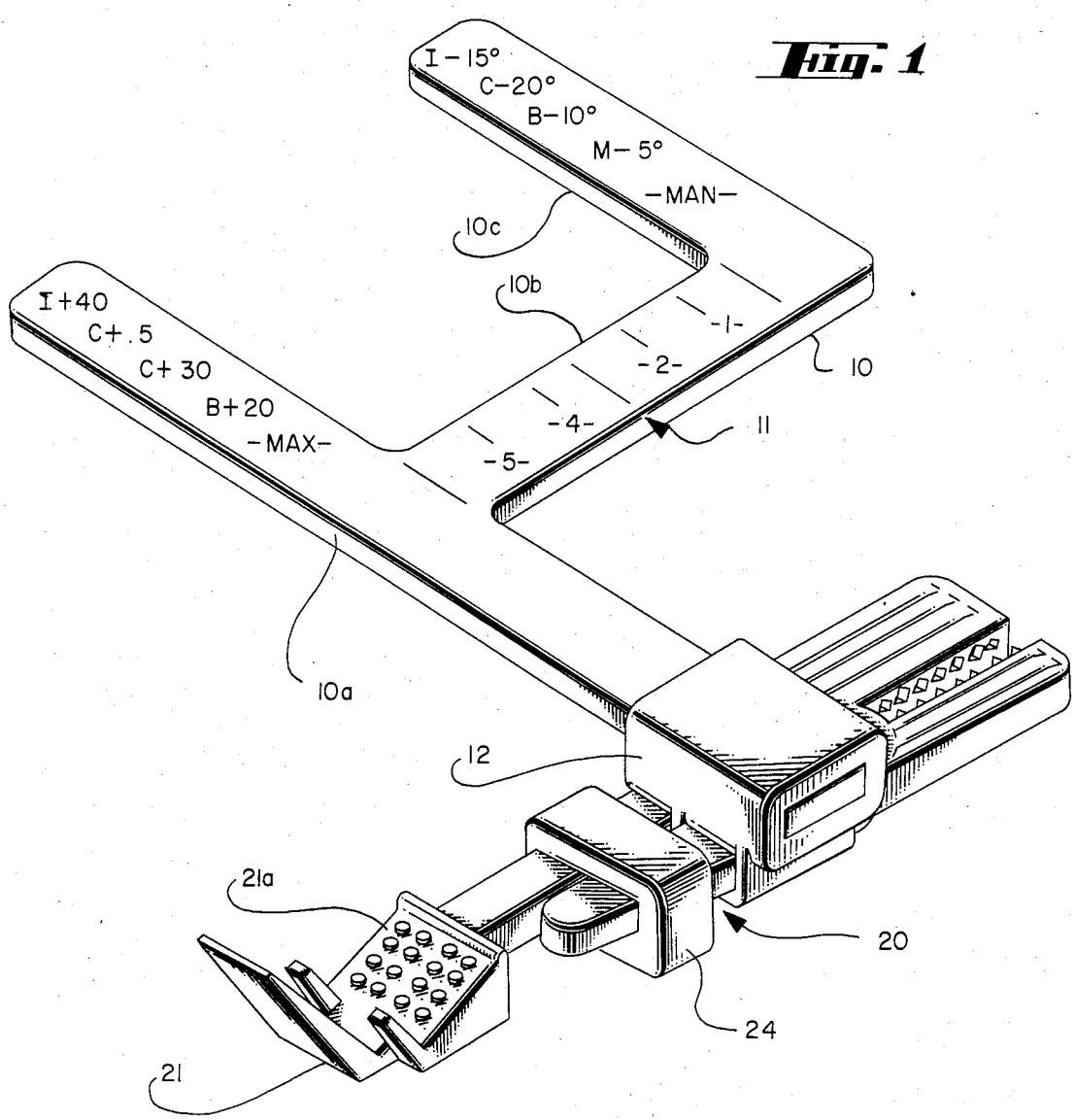
FIG. 1 is a detailed view in perspective of the lower case h-form of X-ray guide for positioning the x-ray cone for maxillary and mandibular teeth periapical x-rays.
Figure 2:
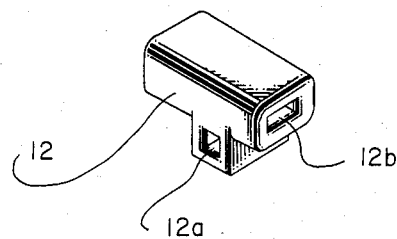
FIG. 2 is an isolated view in perspective of connecting or detachably engageable means 12.

In FIG. 1 is shown the guide for positioning X-ray cones, which comprises an h-shaped exterior guide element 10, a first guide arm 10a, connected laterally through detachably engageable means 12 to the extended arm of the larger jaw of SNAP-A-RAY holder 20, by sliding the lower square like channel 12a of element 12 over said extended arm when said SNAP-A-RAY holder is in the open position, as shown in FIG. 9.

A traverse arm 10b, extends from the midpoit of said first guide arm 10a, parallel to film holder element 21; and a second guide arm 10c, extends perpendicularly from the end of said traverse arm toward the plane of said film holder element, and in parallel relation up to the end point of first guide arm 10a. The traverse arm which is divided in centimeter calibrations help in centering or aiming the X-ray cone toward the center of the area of the film positioned in holder jaw, either by positioning the X-ray cone midway between said first and second guide arms or by using the calibrations on the transverse arm to position the X-ray cone directly in the center of the film via index mark 11.

When the first guide arm 10a is slid into the rectangular shaped channel 12b, of detachably engageable means 12, and the bite tab 21a, with film in element 21, is placed in the mouth to take X-ray pictures of the teeth, the correct angulation from the horizon is determined for the maxillary teeth by the angulations shown on first guide arm 10a, and the correct angulation from the horizon for X-ray pictures of the mandibular teeth is determined by the angulations shown on second guide arm 10c. The h-shaped exterior guide is rotated 180° degrees to the reverse h-shaped when the opposite sides of the upper and lowre jaws are to be X-rayed, and the aforementioned maxillary and mandibular angulation markings are conversely positioned respectively on guide arms 10c and 10a.

Detachable engageable means 12, is the centering element between the h-shaped exterior guide and the SNAP-A-RAY film holder. Connecting element 12, comprises a housing member having an upper rectangular-like shaped enclosed channel running length-wise, and a lower enclosed square-like shaped channel running widthwise. These channels function respectively, to slideably engage and retain the end of guide arm 10a and to slidably engage and hold the extended arm 22 of the larger jaw of the SNAP-A-RAY film holder.

The U-shaped exterior X-ray guide for use in connection with the SNAP-A-RAY film holder, as shown in FIG. 3 allows accurate location of the X-ray film by the X-ray beam during the process of taking intraoral periapical X-rays of the upper and lower front teeth. The base or horizontal arm of guide 30, comprises a projecting reverse T-shaped tab 30c directly beneath index mark 30d, which is a point of reference for centering the X-ray cone. Calibrations on the horizontal arm further help to direct the central beam towards the film. Grooves 31a and 31b serve as placement and holding positions for insertion of SNAP-A-RAY scissor-like jaw extended arms 22 and 23.

When the jaw extended arms are inserted and held in position by slide holding member 24, and the U-shaped guide-SNAP-A-RAY combination with film is placed in the mouth for taking X-rays. The correct angulation from the horizon is determined for the upper front teeth by the maxillary markings on vertical arms 30a and 30b. FIG. 4 is a vertical sectional view showing U-shaped exterior guide 30, used to X-ray an image of upper front teeth 35, onto film 32. When an X-ray of lower front teeth 36 is required, the U-shaped exterior guide is turned upside down or 180° degrees, thereby locking in the tab projection upright in the T-shape and above SNAP-A-RAY holder jaw extended arms 22 and 23. In this position, the correct X-ray angulation from the horizon is determined for the lower front teeth by the mandible markings on the reverse sides of vertical arms 30a and 30b.

FIG. 5 is a sectiona view taken along line IV—IV in FIG. 4, and shows slide holding member 34, holding the extended arms of the jaws firm in grooves 31a and 31b.

The detailed sectional view of FIG. 6, shows the h-shpaed exterior guide in combination with the SNAP-A-RAY holder in place of X-raying the maxillary posterior teeth. The bite tab of film holder jaw, is placed in the patient's mouth and behind the upper teeth 45, so that when the teeth are closed against said bite tab, film 42, is intraorally stabilized in the correct position for taking the X-ray. The X-ray cone is then aligned, either by centering it between guide arms 40a and 40c as shown in FIG. 7, or by using the calibrations on the transverse arm 40b to direct the central beam towards the center of the film 42.

FIG. 7 is a horizontal sectional view along line VII—VII of FIG. 6 looking in the direction of the arrows.

FIG. 8 is a perspective view of the U-shaped X-ray guide separate and apart from the SNAP-A-RAY holder and showing projecting reverse T-shaped tab 30c directly beneath index mark 30d, and centimeter calibrations which are points of reference for centering and aiming the X-ray cone.

A fragmentary view of an open SNAP-A-RAY guide showing extended scissor-like arms 22 and 23 of the jaws of said holder is shown in FIG. 9.

While the invention has been described with reference to preferred embodiments, it is to be understood that variations can be made in the invention scope without departing from the spirit of the invention, which is described in the appendent claims hereinafter set forth.

What is claimed is:

1. An h-shaped exterior guide for use in combination with a SNAP-A-RAY film holder for accurately aligning a beam from an X-ray cone with an X-ray film during the process of taking intraoral periapical dental X-rays of the maxillary and mandibular teeth, comprising:

a first guide arm laterally and detachably connectable through a housing means;

said housing means comprising an upper rectangular enclosed channel running in a first direction to slideabley engage and retain said first guide arm and a lower rectangular enclosed channel running in a second direction perpendicular to said first direction to slideably engage and retain an extended arm of the large jaw of a SNAP-A-RAY type film holder; said first guide arm pointing in a horizontal plane perpendicular to an X-ray film;

a traverse arm extending from the midpoint of said first guide arm and parallel to said X-ray film;

and a second guide arm extending perpendicularly from an end of said traverse arm toward a plane of said X-ray film and in parallel relation up to an end point of said first guide arm; said traverse arm having an index mark mid-way its length and calibrations for aiming an X-ray cone toward a film area; wherein said first guide arm and said second guide arm in parallel relation have maxillary angulation markings on said first guide arm and mandibular angulation markings on said second guide arm.

2. An exterior U-shaped guide for use in combination with a SNAP-A-RAY film holder for accurately aligning a beam from a X-ray cone with an X-ray film during the process of taking intraoral periapical dental X-rays of the upper and lower front teeth, comprising: vertical arms having maxillary and mandibular angulation markings and a horizontal base arm having a projecting reverse T-shaped tab extending directly beneath said base arm; said reverse T-shaped tab having groove means for engaging and retaining extended arms (22, 23) of a bite tab film holder and an extended arm of the large jaw of a SNAP-A-RAY type film holder, said base arm having a midpoint which is index marked directly above said projecting reverse T-shaped tab.

* * * * *

UNITED STATES PATENT AND TRADEMARK OFFICE
CERTIFICATE OF CORRECTION

PATENT NO. : 4,731,808
DATED : March 15, 1988
INVENTOR(S) : Olutunde A. Ogunsunlade It is certified that error appears in the above—identified patent and that said Letters Patent is hereby corrected as shown below:

In FIG. 1, on first guide arm 10a, please cancel the angulation markings "I+40" and C+5";

In FIG. 1, on second guide arm 10c, please cancel the angulation markings "I-15°" and "C-20°".

Signed and Sealed this

Fourteenth Day of February, 1989

Attest:

DONALD J. QUIGG

Attesting Officer

Commissioner of Patents and Trademarks